US011630039B1

United States Patent
Wiederin et al.

(10) Patent No.: US 11,630,039 B1
(45) Date of Patent: Apr. 18, 2023

(54) SPRAY CHAMBER HAVING DUAL INPUT PORTS FOR IMPINGEMENT GAS AND SENSITIVITY ENHANCEMENT GAS ADDITION

(71) Applicant: Elemental Scientific, Inc., Omaha, NE (US)

(72) Inventors: Kevin Wiederin, Omaha, NE (US); Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 827 days.

(21) Appl. No.: 16/534,639

(22) Filed: Aug. 7, 2019

Related U.S. Application Data (60) Provisional application No. 62/715,452, filed on Aug. 7, 2018.

(51) Int. Cl.
    *G01N 1/22*     (2006.01)
    *G01N 1/40*     (2006.01)

(52) U.S. Cl.
    CPC .............. *G01N 1/40* (2013.01); *G01N 1/2208* (2013.01); *G01N 1/2211* (2013.01); *G01N 2001/2223* (2013.01)

(58) Field of Classification Search
    CPC ...... G01N 1/40; G01N 1/2208; G01N 1/2211; G01N 2001/2223; G01N 1/00
See application file for complete search history.

(56) References Cited

U.S. PATENT DOCUMENTS

| | | | | |
|---|---|---|---|---|
| 3,854,321 | A * | 12/1974 | Dahneke | G01N 35/1095 356/336 |
| 8,551,401 | B1 * | 10/2013 | Wiederin | H01J 49/105 422/54 |
| 9,177,772 | B1 * | 11/2015 | Wiederin | G05D 11/02 |
| 9,406,490 | B1 * | 8/2016 | Saetveit | H01J 49/145 |
| 9,620,343 | B1 * | 4/2017 | Field | H01J 49/0422 |
| 2003/0230712 | A1 * | 12/2003 | McLaughlin | G01N 1/14 250/288 |
| 2006/0071177 | A1 * | 4/2006 | Palsulich | H01J 49/04 250/423 P |

(Continued)

FOREIGN PATENT DOCUMENTS

JP     H05242851 A * 9/1993

OTHER PUBLICATIONS

English Translation of JP-H05242851-A (Year: 1993).*

*Primary Examiner* — Alexander A Mercado
(74) *Attorney, Agent, or Firm* — Kevin E. West; Advent, LLP (57) ABSTRACT

Systems and methods are described for introducing an impingement gas and an enhancement gas to an aerosolized sample within a spray chamber. A system embodiment includes, but is not limited to, a chamber body; an input port coupled to the chamber body, the input port configured to receive an aerosolized sample and direct the aerosolized sample into the chamber body; an exit port coupled to the chamber body, the exit port configured to receive at least a portion of the aerosolized sample from the chamber body; an impingement gas port coupled to the exit port and configured to introduce an impingement gas to the at least a portion of the aerosolized sample; and an enhancement gas port coupled to the exit port configured to introduce an enhancement gas to the exit port.

10 Claims, 5 Drawing Sheets

(56) References Cited

U.S. PATENT DOCUMENTS

2008/0035844 A1\* 2/2008 Sakata ................ H01J 49/105
250/288
2017/0338092 A1\* 11/2017 Stephan ............. G01N 30/7273

\* cited by examiner

| HCl Matrix Study No Impingement Gas | Li 7 (cps) | Be 9 (cps) | Na 23 (cps) | Mg 24 (cps) | Al 27 (cps) | K 39 (cps) |
|---|---|---|---|---|---|---|
| 2% HNO3 0.5% HCl Spike Recoveries | 24% | 24% | -3% | -1% | -4% | -22% |
| 2% HNO3 1% HCl Spike Recoveries | 16% | 18% | 22% | 23% | 19% | 35% |
| 2% HNO3 2% HCl Spike Recoveries | 9% | 15% | 38% | 42% | 36% | 47% |
| 2% HNO3 5% HCl Spike Recoveries | -2% | 14% | 60% | 62% | 61% | 57% |

| HCl Matrix Study No Impingement Gas | Ca 43 (cps) | Sc 45 (cps) | Ti 48 (cps) | V 51 (cps) | Cr 52 (cps) |
|---|---|---|---|---|---|
| 2% HNO3 0.5% HCl Spike Recoveries | -32% | -36% | -34% | -23% | -42% |
| 2% HNO3 1% HCl Spike Recoveries | 46% | 48% | 47% | -20% | -53% |
| 2% HNO3 2% HCl Spike Recoveries | 62% | 60% | 59% | -10% | -61% |
| 2% HNO3 5% HCl Spike Recoveries | 83% | 79% | 77% | 22% | -67% |

FIG. 3A

| HCl Matrix Study--200x Impingement Gas | Li 7 (ppb) | Be 9 (ppb) | Na 23 (ppb) | Mg 24 (ppb) | Al 27 (ppb) | K 39 (ppb) |
|---|---|---|---|---|---|---|
| 2% HNO3 0.5% HCl Spike Recoveries | -2% | 0% | -14% | -14% | -10% | -9% |
| 2% HNO3 1% HCl Spike Recoveries | -6% | -4% | -17% | -19% | -16% | -27% |
| 2% HNO3 2% HCl Spike Recoveries | -8% | -7% | -26% | -26% | -21% | -59% |
| 2% HNO3 5% HCl Spike Recoveries | -17% | -16% | -42% | -42% | -35% | -152% |

| HCl Matrix Study--200x Impingement Gas | Ca 43 (ppb) | Sc 45 (ppb) | Ti 48 (ppb) | V 51 (ppb) | Cr 52 (ppb) |
|---|---|---|---|---|---|
| 2% HNO3 0.5% HCl Spike Recoveries | -9% | -8% | -5% | 8% | -12% |
| 2% HNO3 1% HCl Spike Recoveries | -11% | -14% | -12% | 17% | -17% |
| 2% HNO3 2% HCl Spike Recoveries | -37% | -18% | -16% | 37% | -19% |
| 2% HNO3 5% HCl Spike Recoveries | -26% | -30% | -28% | 67% | -28% |

FIG. 3B

HCl Matrix Study--200x Impingement Gas + 15mL/min Enhancement Gas

| | Li 7 (ppb) | Be 9 (ppb) | Na 23 (ppb) | Mg 24 (ppb) | Al 27 (ppb) | K 39 (ppb) |
|---|---|---|---|---|---|---|
| 2% HNO3 0.5% Spike Recoveries | -4% | -3% | -1% | -3% | -1% | 3% |
| 2% HNO3 1% HCl Spike Recoveries | -5% | -3% | 1% | -3% | -2% | 6% |
| 2% HNO3 2% HCl Spike Recoveries | -5% | -4% | -5% | -5% | -3% | 4% |
| 2% HNO3 5% HCl Spike Recoveries | -7% | -4% | -7% | -9% | -7% | 2% |

HCl Matrix Study--200x Impingement Gas + 15mL/min Enhancement Gas

| | Ca 43 (ppb) | Sc 45 (ppb) | Ti 48 (ppb) | V 51 (ppb) | Cr 52 (ppb) |
|---|---|---|---|---|---|
| 2% HNO3 0.5% Spike Recoveries | 2% | -1% | 2% | 0% | -1% |
| 2% HNO3 1% HCl Spike Recoveries | 7% | -1% | 2% | 1% | -2% |
| 2% HNO3 2% HCl Spike Recoveries | -1% | -3% | 1% | 3% | -4% |
| 2% HNO3 5% HCl Spike Recoveries | -4% | -5% | -4% | 9% | -5% |

FIG. 3C

SPRAY CHAMBER HAVING DUAL INPUT PORTS FOR IMPINGEMENT GAS AND SENSITIVITY ENHANCEMENT GAS ADDITION

CROSS-REFERENCE TO RELATED APPLICATIONS

The present application claims the benefit of 35 U.S.C. § 119(e) of U.S. Provisional Application Ser. No. 62/715,452, filed Aug. 7, 2018, and titled "SPRAY CHAMBER HAVING DUAL INPUT PORTS FOR IMPINGEMENT GAS AND SENSITIVITY ENHANCEMENT GAS ADDITION." U.S. Provisional Application Ser. No. 62/715,452 is herein incorporated by reference in its entirety.

BACKGROUND

Inductively Coupled Plasma (ICP) spectrometry is an analysis technique used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods are described for introducing an impingement gas and an enhancement gas to an aerosolized sample with a spray chamber. A system embodiment includes, but is not limited to, a chamber body; an input port coupled to the chamber body, the input port configured to receive an aerosolized sample and direct the aerosolized sample into the chamber body; an exit port coupled to the chamber body, the exit port configured to receive at least a portion of the aerosolized sample from the chamber body; an impingement gas port coupled to the exit port and configured to introduce an impingement gas to the at least a portion of the aerosolized sample; and an enhancement gas port coupled to the exit port configured to introduce an enhancement gas to the exit port.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Sample introduction systems can employ spray chambers to sort aerosolized samples generated by a nebulizer to remove larger aerosol particles, which can be detrimental to the plasma flame maintained by the ICP torch. Matrix components of the sample, such as volatile organic materials or relatively high concentrations of salts, can also cause the ICP torch to have difficulty in maintaining the torch. If the torch becomes extinguished, insufficient, or otherwise compromised, a sample introduced to the ICP spectrometry instrumentation may not be properly ionized or provide proper emissions, which could provide inaccurate concentration data, clog or foul instrumentation, or the like. One technique to remove or reduce matrix components of an aerosolized sample is through impingement. Example impingement techniques introduce a flow of an impingement gas to the aerosolized sample flow (e.g., as the sample is exiting a spray chamber) to impact matrix components against a sidewall of the spray chamber and out a drain. However, when the impingement gas impacts the matrix components, other sample components are impinged, causing a reduction in sample intensity for sample that proceeds to the ICP torch. The reduction in sample intensity can lead to inaccurate concentration data for the measured sample.

In one aspect, the present disclosure is directed to a sample preparation system that includes a spray chamber having two inputs ports for receiving gases for treating aerosolized samples with two gases to provide benefits of impingement while reducing or avoiding reduction in sample intensity caused by impingement. A first input port of the spray chamber receives an impingement gas to impact matrix components of an aerosolized sample against a sidewall of the spray chamber. Impacted matrix components are removed via a drain of the spray chamber to prevent introduction to the ICP torch. A second input port of the spray chamber receives an enhancement gas to introduce to the aerosolized sample following impingement to increase the sensitivity of a plurality of elements present in the sample during analysis of the sample.

Example Implementations

Figure 1:
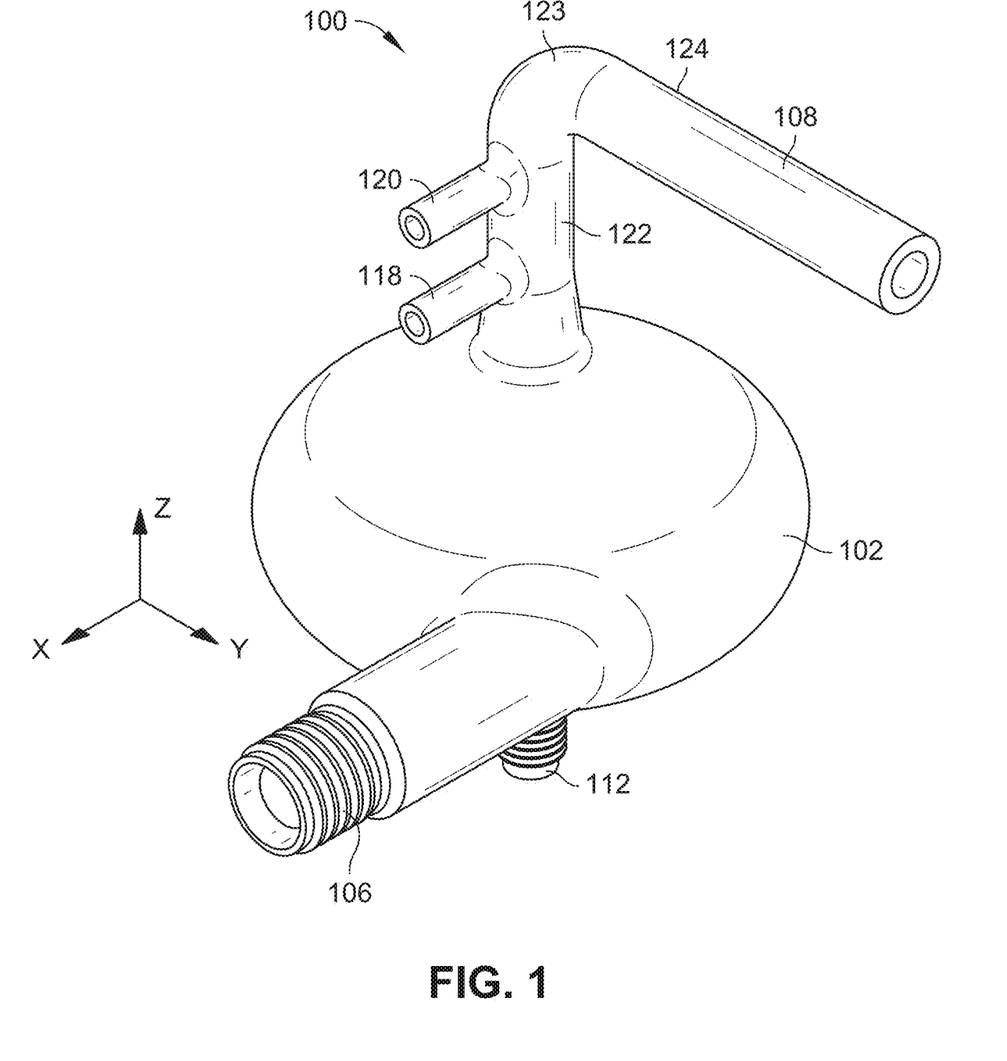
FIG. 1 is an isometric view of a spray chamber having dual input ports for receiving an impingement gas and an enhancement gas, in accordance with example implementations of the present disclosure.
Figure 2:
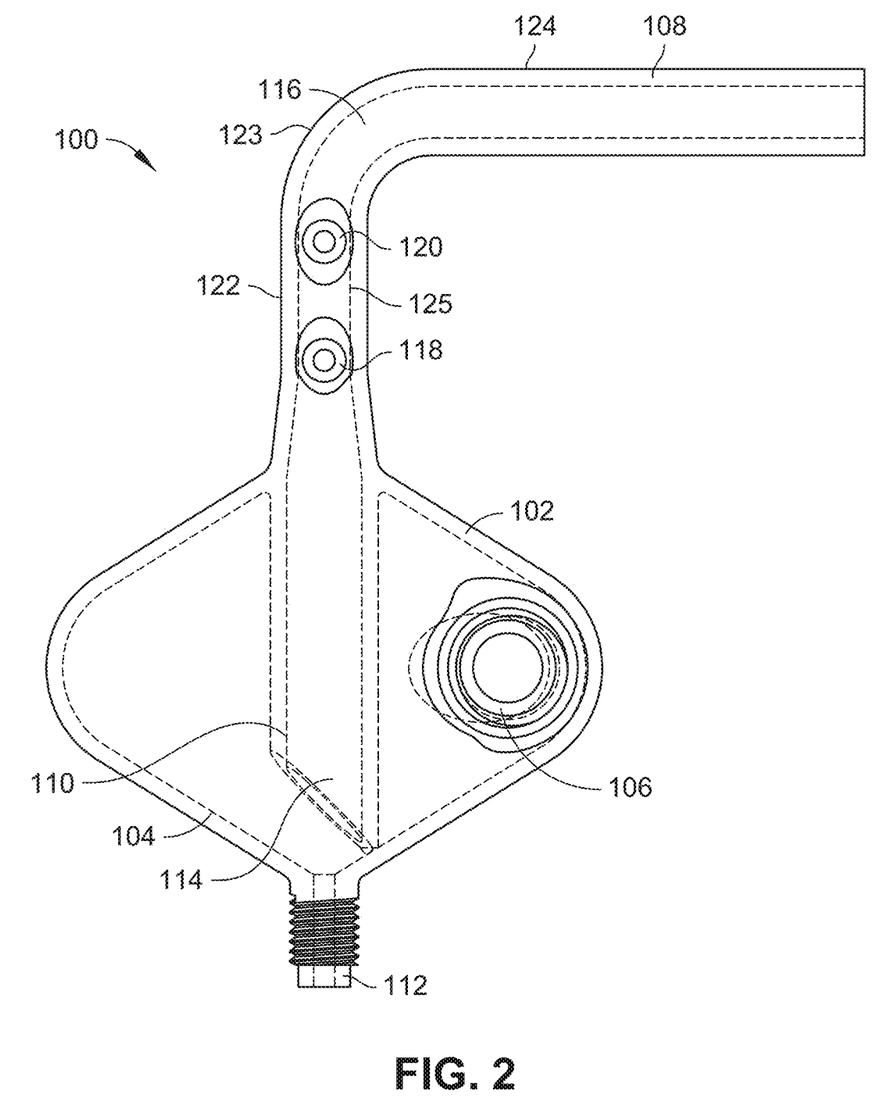
FIG. 2 is a side view of the spray chamber of FIG. 1.

Referring generally to FIGS. 1-2, a spray chamber 100 is shown in accordance with an embodiment of this disclosure. Those skilled in the art will appreciate that the embodiments illustrated in the drawings and/or described herein may be modified or fully or partially combined to result in additional embodiments. Accordingly, the illustrated and described embodiments should be understood as explanatory and not as limitations of the present disclosure.

The spray chamber 100 includes a chamber 102 that can be formed from a glass material (e.g., glass or quartz, or the like) or chemically inert material having an interior volume used to sort aerosolized sample particles by size, with larger aerosolized particles impacting interior sidewalls 104 of the chamber 102. The spray chamber 100 includes an input port 106 coupled with the chamber 102 to receive a sample into the spray chamber 100. For example, the input port 106 is connectible with a nebulizer which receives a liquid sample and aerosolizes the sample into the chamber 102 via the input port 106. The input port 106 is horizontally offset with respect to a center of the chamber 102 to direct the sample into the interior of the chamber 102 and to promote a cyclonic flow of aerosolized sample within the interior of the chamber 102. The liquid sample can be introduced to the nebulizer through operation of a pump (e.g., a syringe pump, a peristaltic pump, etc.), a self-aspirating nebulizer, or combinations thereof.

The spray chamber 100 further includes an exit port 108 outside the chamber 102 and a baffle 110 (shown in FIG. 2) inside the chamber 102. The exit port 108 is connected to the baffle 110. For example, the exit port 108 and the baffle 110 can be portions of a continuous tube extending from inside the chamber 102 to outside the chamber 102 to provide a fluid flow path for aerosolized sample to travel from inside the chamber 102 (as sample is introduced via the input port 106) to outside the chamber 102 (as sample exits the spray chamber 100 via the exit port 108 or a drainage port 112). The baffle 110 and the exit port 108 may also be formed from the glass material and can be portions of an integrated structure including the chamber 102 and possibly other portions of the spray chamber 100, such as the input port 106 and the drainage port 112. For example, some or all portions of the spray chamber 100 can comprise a single integrated structure formed of glass, quartz, or other glass material. The drainage port 112 provides a waste outlet from the spray chamber 100, such as by receiving and removing (e.g., drain out) waste droplets shed from interior surfaces of the chamber 102 (e.g., interior sidewalls 104), exit port 108, input port 106, baffle 110, etc.).

A sample flowpath through the spray chamber 100 generally involves an aerosolized sample being introduced to the chamber 102 through the input port 106 (e.g., through action of a nebulizer in fluid communication with the input port 106). The aerosolized sample can be spun through the interior volume of the chamber 102, where larger aerosolized particles can impact with the interior sidewalls 104 of the chamber 102, the baffle 110, etc. to be removed from the spray chamber 100 via the drainage port 112. The other aerosolized sample portions can travel into an interior region 114 of the baffle 110 which is coupled with an interior region 116 of the exit port 108 to transfer the sample from the chamber 102 and out of the spray chamber 100 via the exit port 108. For example, the aerosolized sample can be transferred to an analysis system through fluid communication with an ICP injector or another sample preparation device.

The spray chamber 100 further includes two input ports to receive gases to introduce to the aerosolized sample. For example, the spray chamber 100 includes an impingement gas port 118 and an enhancement gas port 120 coupled to the exit port 108 external the chamber 102. The impingement gas port 118 is coupled to an impingement gas source to introduce an impingement gas to the aerosolized sample as the sample travels through the interior region 116 of the exit port 108 following passage through the interior region 114 of the baffle 110. The exit port 108 is generally formed from an extension portion 122 coupled to the chamber 102 that bends or otherwise transitions into extension portion 124 via connection 123. The extension portion 122 and the extension portion 124 each define the interior region 116, where the extension portion 122 is coupled to the baffle 110 to provide a fluid flowpath from the interior region 114 of the baffle 110 to the interior region 116 of the exit port 108. In an example implementation, the extension portion 122 is substantially perpendicular to the extension portion 124 with the connection interposed between the extension portion 122 and the extension portion 124. The displacement between the extension portion 122 and the extension portion 124 provided by the connection 123 is not limited to a substantially perpendicular arrangement and can vary based upon a desired direction of output, connection(s) to analytical instrumentation or fluid handling systems, or the like. For example, the extension portion 122 can be offset from the extension portion 124 by an angle from about 45 degrees to about 135 degrees, more particularly by an angle from about 60 degrees to about 120 degrees, or more particularly by an angle from about 75 degrees to about 105 degrees.

In an example implementation, the impingement gas port 118 is coupled to the extension portion 122 with a substantially perpendicular configuration. For example, the impingement gas port 118 can be positioned along the x-axis shown in FIG. 1 and the extension portion 122 can be positioned along the z-axis. In such a configuration, impingement gas is introduced in a substantially crossflow configuration with respect to the aerosolized sample within the interior region 116 of the exit port 108. The substantially crossflow configuration can allow the impingement gas to impact the aerosolized sample and direct portions of the sample matrix against the sidewalls 125 of the exit port 108 forming the interior region 116. The displacement between the impingement gas port 118 and the extension portion 122 is not limited to substantially perpendicular arrangements and can vary based upon a desired amount of impingement or other factors. For example, the impingement gas port 118 can be offset from the extension portion 122 by an angle from about 45 degrees to about 135 degrees, more particularly by an angle from about 60 degrees to about 120 degrees, or more particularly by an angle from about 75 degrees to about 105 degrees. Sample matrix portions impacted by the impingement gas can flow down the exit port 108 through the baffle 110 and exit the spray chamber 100 via the drainage port 112. Further, the impingement gas port 118 is coupled to the extension portion 122 in a substantially crossflow configuration with respect to the extension portion 124. For example, the impingement gas port 118 can be positioned along the x-axis shown in FIG. 1 and the extension portion 124 can be positioned along the y-axis. The substantially crossflow configuration between the flow of fluid through the impingement gas port 118 and the extension portion 124 can prevent or otherwise mitigate introduction of the impingement gas from directing the impacted sample matrix into the extension portion 124 as opposed to back down into the chamber 102. The position of the impingement gas port 118 relative to the extension portion 124 is not limited to a substantially crossflow configuration and can include other arrangements, such as a counterflow arrangement with the impingement gas port 118 and the extension portion 124 arranged along the y-axis, but with opposite direction of fluid flow, or other orientations of impingement gas port 118 between the x- and y-axes. In an example implementation, the impingement gas includes an inert gas, such as argon.

The enhancement gas port 120 is coupled to the exit port 108 to introduce an enhancement gas from an enhancement gas source to the aerosolized sample. The impingement gas port 118 is coupled to the exit port 108 between the chamber 102 and the enhancement gas port 120, such that the impingement gas is introduced to the aerosolized sample in the extension portion 122 prior to introduction of the enhancement gas to the aerosolized sample. While the enhancement gas port 120 is shown in a substantially parallel configuration with respect to the impingement gas port 118, non-planar configurations of the impingement gas port 118 and the enhancement gas port 120 can be utilized. In an implementation, the impingement gas port 118, the enhancement gas port 120 and the input port 106 are arranged substantially parallel to each other. The enhancement gas can improve the signals of analytes measured by the analysis system following exit of the sample from the spray chamber 100, where a portion of the analytes can be removed from the aerosolized sample stream through introduction of the impingement gas. In an example implementation, the enhancement gas includes nitrogen. The enhancement gas can be introduced to the enhancement gas port 120 at a rate from approximately 1 mL/min to approximately 20 mL/min. The impingement gas can be introduced to the impingement gas port 118 at a rate from approximately 100 mL/min to approximately 500 mL/min. For example, the impingement gas can be introduced to the spray chamber 100 from approximately five times to approximately five hundred (500) times the volumetric rate of introduction of the enhancement gas. The aerosolized sample can be introduced to the input port 106 at a rate from approximately 200 mL/min to approximately 400 mL/min.

Example Experimentation Data

Figure 3A:
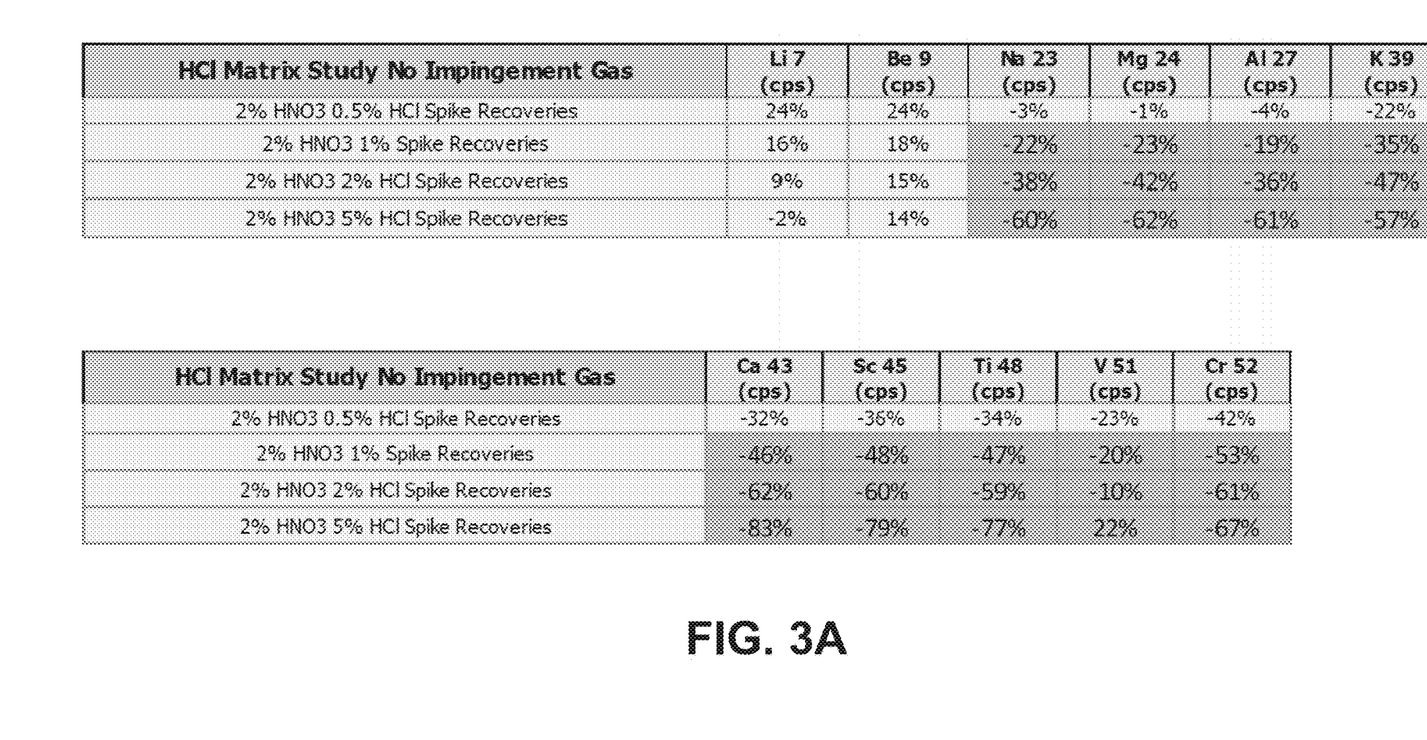
FIG. 3A is a table showing recovery of various chemical standards in differing concentrations of hydrochloric acid matrices, without any added impingement gas or enhancement gas.
Figure 3B:
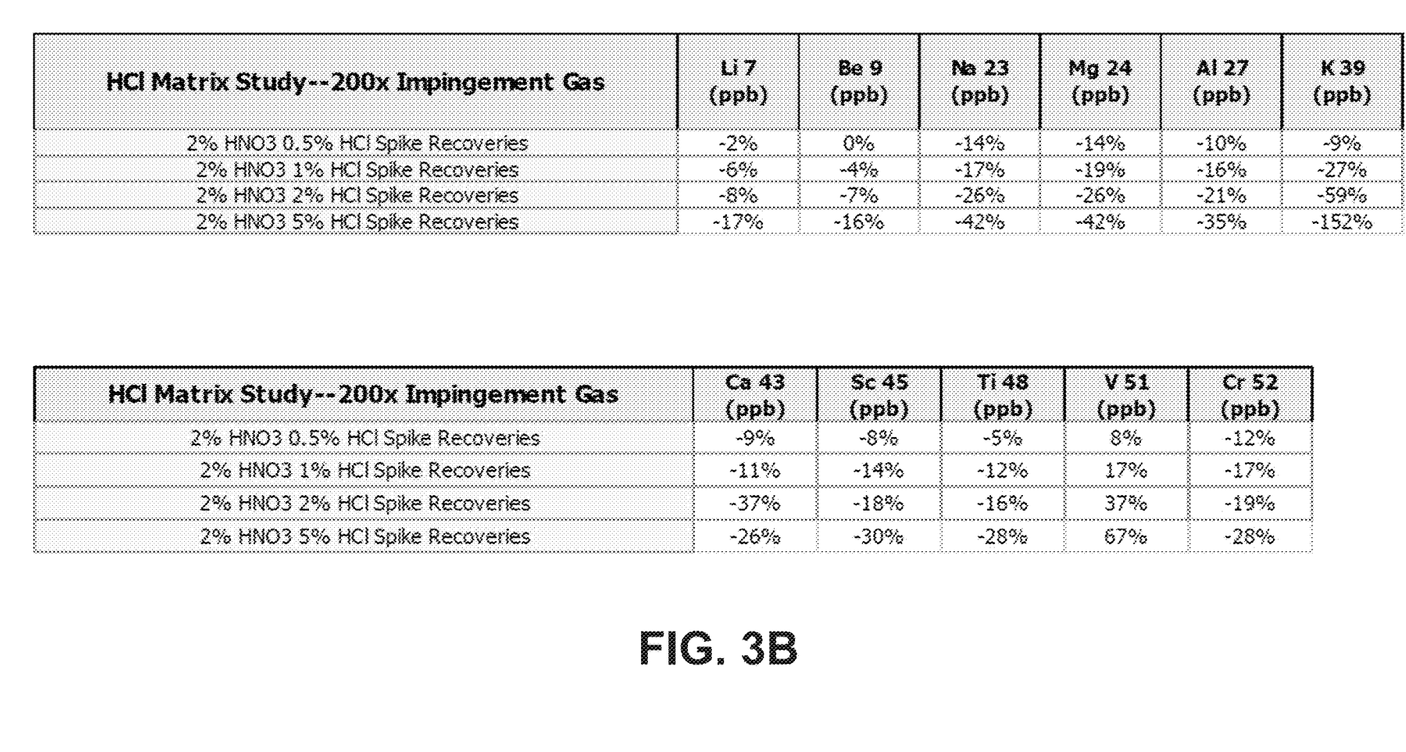
FIG. 3B is a table showing recovery of various chemical standards in differing concentrations of hydrochloric acid matrices, with added impingement gas, but without any added enhancement gas.
Figure 3C:
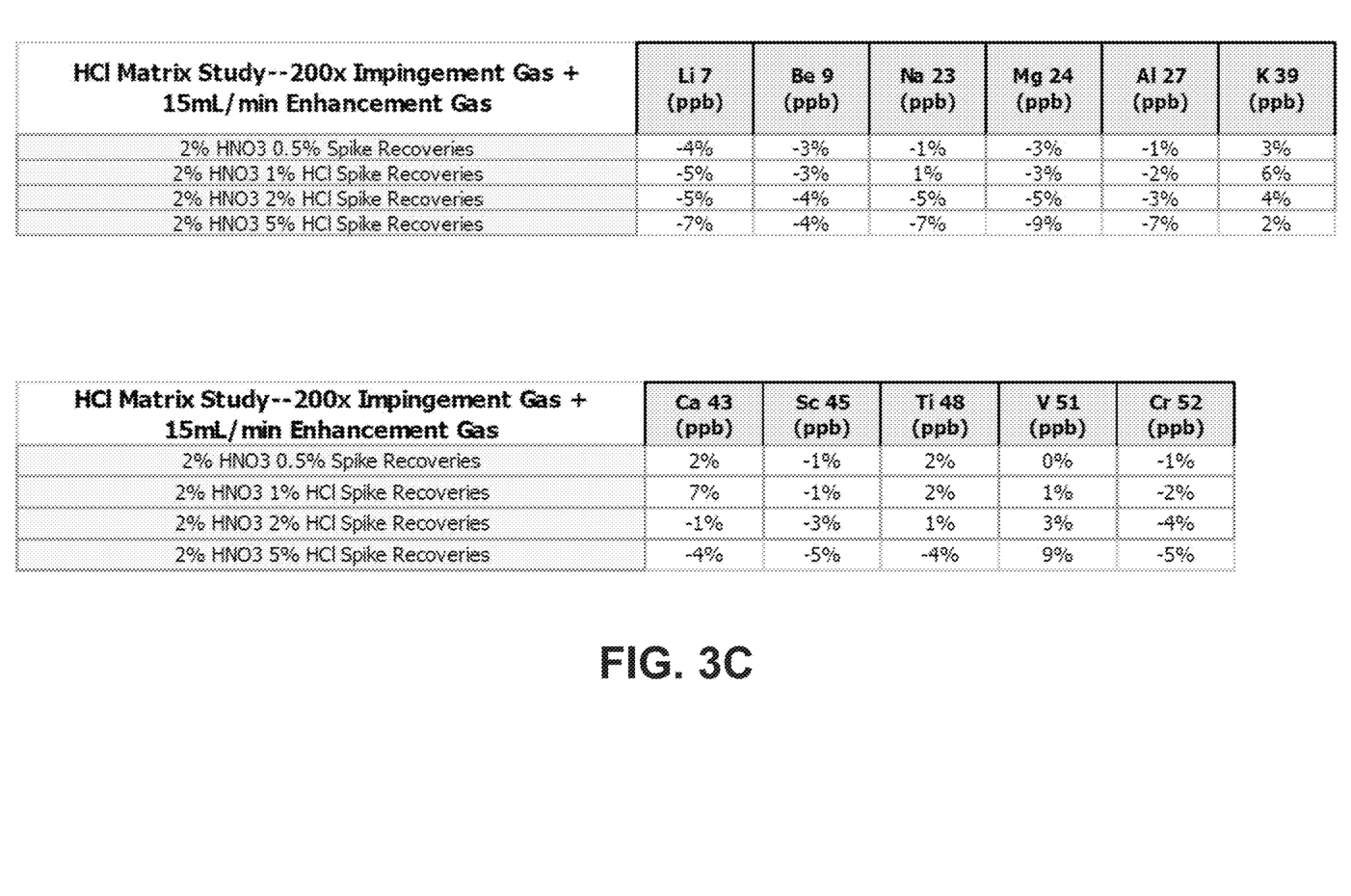
FIG. 3C is a table showing recovery of various chemical standards in differing concentrations of hydrochloric acid matrices, with added impingement gas and added enhancement gas.

Referring generally to FIGS. 3A-3C, samples having various chemical analytes with known concentrations were tested with an ICP analytical instrument using the spray chamber 100 described with reference to FIGS. 1-2. The chemical analytes included lithium, beryllium, sodium, magnesium, aluminum, potassium, calcium, scandium, titanium, vanadium, and chromium. The samples were tested in 2% vol. nitric acid with hydrochloric acid sample matrices in concentrations of 0.5%, 1%, 2%, and 5% vol. The samples were analyzed under three scenarios: (1) no added impingement gas or enhancement gas; (2) added impingement gas and no added enhancement gas; (3) added impingement gas and enhancement gas. The impingement gas was added to reduce the tuned intensity of the analytes by approximately 200 times, allowing the impingement gas to reduce the amount of matrix loading onto the plasma of the ICP torch. The results of analysis under the three scenarios are shown in FIGS. 3A-3C, where FIG. 3A shows recovery of various chemical standards in the differing concentrations of hydrochloric acid matrices, without any added impingement gas or enhancement gas, FIG. 3B shows recovery of various chemical standards in the differing concentrations of hydrochloric acid matrices, with added impingement gas, but without any added enhancement gas, and FIG. 3C shows recovery of various chemical standards in the differing concentrations of hydrochloric acid matrices, with added impingement gas and added enhancement gas. Increasing the concentration of hydrochloric acid demonstrated signal suppression of the analytes, as shown at least in FIG. 3A. However, introduction of both impingement gas and enhancement gas demonstrated improved recovery for most analytes as compared to impingement gas addition alone.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for preparing a sample for sample analysis with a spray chamber, comprising:
   receiving an aerosolized sample with a spray chamber, the spray chamber including
      a chamber body,
      an input port coupled to the chamber body, the input port configured to receive the aerosolized sample and direct the aerosolized sample into the chamber body,
      an exit port coupled to the chamber body, the exit port configured to receive at least a portion of the aerosolized sample from the chamber body,
      an impingement gas port coupled to the exit port and configured to introduce an impingement gas to the at least a portion of the aerosolized sample, and
      an enhancement gas port coupled to the exit port configured to introduce an enhancement gas to the exit port, the enhancement gas configured to increase a sensitivity of the at least a portion of the aerosolized sample when analyzed by an analytical instrument;
   introducing the impingement gas through the impingement gas port to introduce the impingement gas to the at least a portion of the aerosolized sample; and
   introducing the enhancement gas through the enhancement gas port downstream from the impingement gas port to introduce the enhancement gas to aerosolized sample within the exit port.

2. The method of claim 1, further comprising:
   draining at least a portion of the aerosolized sample from the spray chamber via a drainage port coupled to the chamber body.

3. The method of claim 2, wherein the drainage port is positioned on an end of the chamber body opposite the exit port.

4. The method of claim 1, wherein the impingement gas port is coupled between the enhancement gas port and the chamber body.

5. The method of claim 1, wherein the impingement gas port and the enhancement gas port are arranged in a substantially parallel configuration.

6. The method of claim 1, wherein the impingement gas port is coupled to the exit port at an angle from 45 degrees to 135 degrees.

7. The method of claim 1, wherein the impingement gas port is coupled to the exit port in a substantially perpendicular arrangement.

8. The method of claim 1, wherein the exit port includes a first extension portion and a second extension portion offset from the first extension portion, and wherein the second extension portion is coupled to the first extension portion by a connection providing a continuous fluid flow pathway from the extension portion through the connection and through the second extension portion.

9. The method of claim 8, wherein each of the impingement gas port and the enhancement gas port are coupled to the first extension portion.

10. The method of claim 1, wherein the exit port includes a first extension portion and a second extension portion offset from the first extension portion, and wherein the second extension portion is coupled to the first extension portion by a connection providing a continuous fluid flow pathway from the extension portion through the connection and through the second extension portion, the first extension portion coupled to the chamber body between the second extension portion and the chamber body, wherein each of the impingement gas port and the enhancement gas port are coupled to the first extension portion.

\* \* \* \* \*